United States Patent [19]

Dautremay et al.

[11] Patent Number: 4,749,928
[45] Date of Patent: Jun. 7, 1988

[54] DEVICE FOR REDUCING THE LAG IN RECOVERY OF A NON-LINEAR SUBSIDIARY CONTROLLER

[75] Inventors: Gérard Dautremay, Grenoble; Dimitry Khaletzky, Bernin, both of France

[73] Assignee: Société NEYRPIC, Grenoble, France

[21] Appl. No.: 26,382

[22] Filed: Mar. 16, 1987

[30] Foreign Application Priority Data

Mar. 28, 1986 [FR] France ................................ 86 04737

[51] Int. Cl.⁴ .............................................. G05B 11/42
[52] U.S. Cl. ..................................... 318/610; 318/561; 318/609
[58] Field of Search .......................... 318/610, 609, 561

[56] References Cited

U.S. PATENT DOCUMENTS 4,146,270 3/1979 Nurmberger et al. .......... 318/610 X

FOREIGN PATENT DOCUMENTS 2496922 10/1983 France .

OTHER PUBLICATIONS

Article "Speed Governing System For Rotating Machines Electro-Hydraulic Control Copying System" M. Dautremay pp. 27–38 From Revue Technique NEYRPIC, No. 6 1987.

Primary Examiner—William M. Shoop, Jr.
Assistant Examiner—Saul M. Bergmann
Attorney, Agent, or Firm—Dowell & Dowell

[57] ABSTRACT

This invention relates to an improved device for reducing the lag of position of a non-linear copying system or subsidiary controller for a regulation loop, which comprises a comparator establishing the difference which enters in a multiplier from which emerges a signal sent into another comparator elaborating the difference between this signal and the difference between the frequency and the frequency reference, so that the output of this comparator is introduced into the integral action circuit of the subsidiary controller.

3 Claims, 1 Drawing Sheet

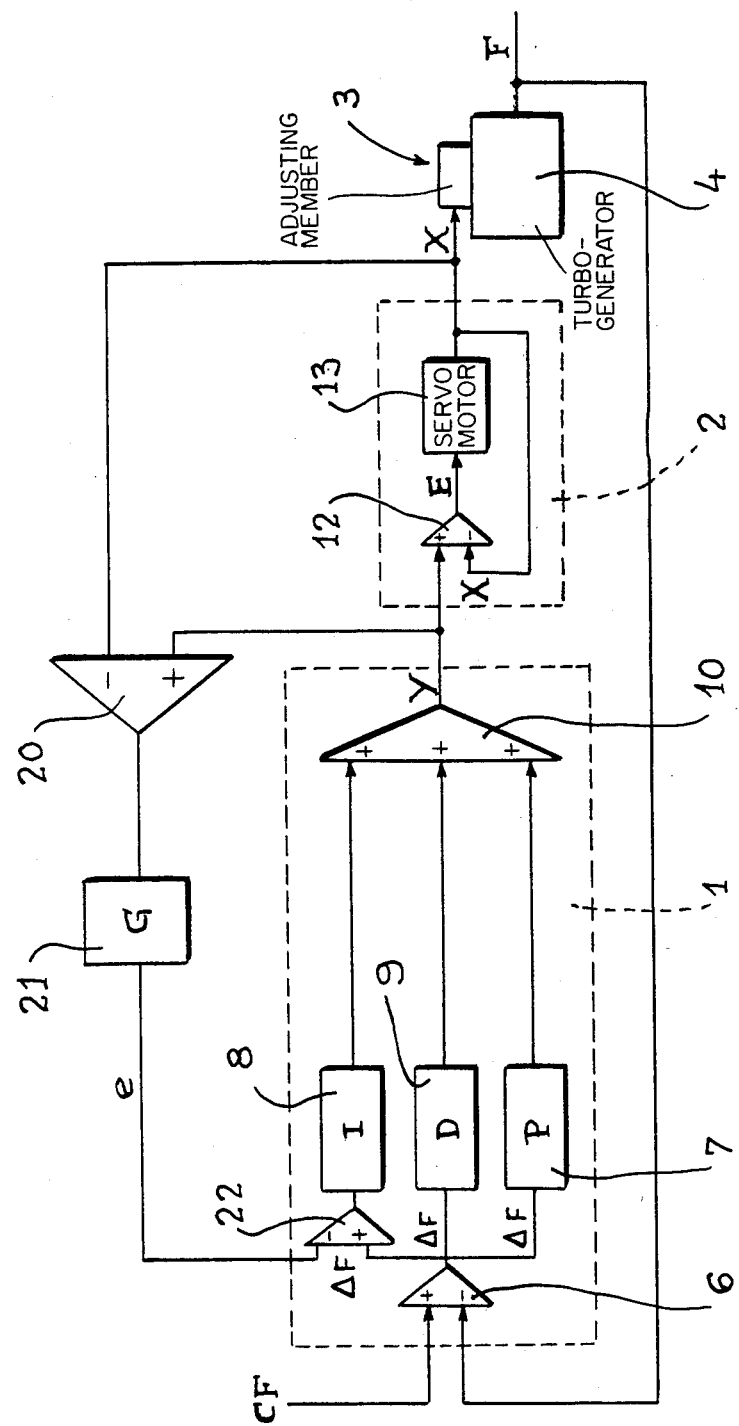

DEVICE FOR REDUCING THE LAG IN RECOVERY OF A NON-LINEAR SUBSIDIARY CONTROLLER

BACKGROUND OF THE INVENTION

The present invention relates to an improved device for reducing the lag in position of a non-linear subsidiary or copying system for a regulation loop for turbo generators.

HISTORY OF THE RELATED ART

Applicant's French Pat. No. 2 496 922 discloses a process for automatically reducing the lag in position of a non-linear subsidiary or copying system for a regulation loop for turbo-generators, as well as a device for carrying it out.

It will be recalled that the speed of a turbine is a function of at least one parameter. For example, the speed of a PELTON turbine is directly a function of at least the position of an injector which regulates the flowrate and of which the speed of displacement if relatively slow, with the result that actuation of this adjusting member does not allow a rapid variation of the flowrate, therefore of the power and consequently of the speed of the turbine. Furthermore, the speed of the turbine is also a function of another parameter which is, for example for PELTON turbines, the position of the deflectors placed in front of the injectors.

The prior document mentioned above relates to a process for adapting the signal emitted by the primary circuit regulator as a function of the difference in frequency noted between the frequency of the current produced and the one desired, and the real value of the position of the adjusting member. In the process, the two thresholds of saturation of at least one of the proportional (P), integral (I) or derivative (D) action circuits are acted upon, the values of these two thresholds of saturation themselves being determined as a function of the real position of the adjusting member and of the sum of the responses of the other action circuits not concerned.

The document in question also describes a device for carrying out the above process.

Although that invention makes it possible considerably to reduce the lag of the member for adjusting the speed of the turbine or the like with respect to the drop in its speed (and of the frequency of the current) due to an overload, the device described in the document in question is relatively complex in construction, leading to a high cost price.

SUMMARY OF THE INVENTION

It is an object of the improvements forming the subject matter of the present invention to overcome the drawback discussed above and to allow a process to be elaborated which responds better to the requirements of the art. The present invention also relates to a device for carrying out this process.

The process according to the invention consists in acting on the input signal of the integral action circuit of the regulator proportionally to the difference between the real value of the position of the member for adjusting the speed of the turbine and the overall signal of theoretical position of this member.

The device for carrying out this process comprises a comparator establishing the difference between the real value of position of the mobile adjusting member and the overall signal of theoretical position of this member, this difference entering into a multiplier from which emerges a signal sent to another comparator elaborating the difference between this latter signal and the difference between the rear frequency and the frequency reference, in order that the output of this comparator be introduced into the integral action circuit of the regulator.

BRIEF DESCRIPTION OF THE DRAWING

The invention will be more readily understood on reading the following description with reference to the accompanying drawings, in which:

The single FIGURE is a block diagram showing a regulation assembly according to the invention.

It will be noted that the references chosen in the present specification correspond, for greater clarity, to those used in the prior French Pat. No. 2 496 922.

DESCRIPTION OF THE PREFERRED EMBODIMENT

Referring now to the drawings, the regulation device according to the invention, comprising as explained hereinbelow a regulator or primary controller 1 of the PID type and a subsidiary or copying circuit 2 which is adapted to adjust, in appropriate manner, the position of one of the adjusting elements, for example the injector 3 of a turbo-generator 4, of which the turbine is a Pelton turbine. The adjusting element 3 may of course also be the hydraulic fluid deflector assembly.

The device according to the invention comprises a conventional regulator or primary controller 1 of the PID type, comprising a differential amplifier 6 of which the output signal $\Delta F$ is applied to both the proportional (7) and derivative (9) action circuits. The regulator also comprises an integral action circuit 8 which, according to the invention, receives an input signal different from those of the other two circuits 7 and 9.

In a conventional regulator 1, the signals leaving circuits 7–8–9 are introduced into a system 10 which adds them in order to furnish an order of action Y entering in a differential amplifier 12 of the subsidiary or copying circuit 2. In the circuit 2, the signal Y is compared with the real position X of the adjusting member 3 in the differential comparator 12, so that the error in position E thus detected is applied to the active member 13 which may be a servo-motor, for example intended for controlling the needle of the injector 3 of the turbo-generator 4 furnishing a current of frequency F.

As indicated in prior French Pat. No. 2 496 922, in steady state, the difference $\Delta F$ between the frequency reference CF and the output frequency F of the turbo-generator 4 is zero, with the result that Y and X are constant and the difference of position E is also zero.

Generally, and in particular for the case of the regulation of turbines, the subsidiary or copying system 2 is voluntarily non-linear.

If considerable disturbances occur on the network, for example a very high demand for current, and if said network is of small geographical importance, these disturbances react immediately, since there is no inertia of a large general network to absorb this disturbance. From the start of this disturbance, the position reference Y increases rapidly, while the effective position of the adjusting member 3 increases in accordance with its limited maximum speed. In fact, the servo-motor 13 gives a speed of displacement of the member 3 which is constant and generally low with respect to the variation of reference Y. When the frequency error Δ F has sufficiently decreased, the position of the adjusting member 3 must begin its stabilization around the final steady state. Now, the position reference Y has had the time largely to exceed this value X and cannot return instantaneously. It follows that the adjusting member remains too open for a period of time which may be long, with the result that, during this period, the turbo-generator 4 is in overspeed.

According to the invention, the process for automatically reducing lag consists in acting proportionally to the difference between the value X of the position of the adjusting member 3 of the generator 4 and the overall reference position signal Y on the input of the integral action circuit 8 of the regulator 1.

The foregoing lag reduction is accomplished by providing a comparator 20 of the values of X and of Y as defined hereinabove. In the case of a turbine having two adjusting members, such as a Pelton turbine, only one of these members is chosen in any case, i.e. the one of which the maximum speed of variation X is the most adapted to the adjustment envisaged.

The signal (X—Y) leaving the comparator 20 enters into a multiplier 21 which multiplies this difference by a parameter G which is a function of the characteristics of the hydraulic motor of the turbo-generator 4 in order to determine a signal 3. The signal e is sent into another comparator 22 which also receives the difference αF between the frequency reference and the frequency of the circuit. This comparator emits an output which is directly introduced into the integral action circuit 8.

Thanks to this device, the reference Y differs only very slightly from the effective position of the adjusting member chosen when the latter evolves at its maximum speed. When the frequency error has sufficiently decreased, the speed of the member decreases and the servo-control returns to a linear operational mode. Passage from non-linear mode (member 3 with saturation of speed) to linear mode (X following Y very closely) occurs without loss of time, as Y remains close to X also in non-linear mode.

A device has thus been produced which makes it possible to reduce the lag as described in Applicants' prior art mentioned above, and which is less expensive.

It must, moreover, be understood that the foregoing description has been given only by way of example and that it is no way limits the domain of the invention which would not be exceeded by replacing the details of execution described by any other equivalents. In particular, the invention is applicable within the framework of analog or digital technology.

What is claimed is:

1. A process for automatically reducing the lag in recovery of a non-linear subsidiary controller integrated in a loop for regulating a magnitude characteristic of a system provided with at least one adjusting member, in which the loop includes:

a regulator receiving the real value of the magnitude to be regulated and the reference value of this same magnitude, and in which the input difference signal between these two values is applied to proportional, derivative and integral action circuits, of which the responses are added to constitute an overall position signal of the adjusting member;

a non-linear subsidiary controller receiving the signal from the regulator and the real position signal of the adjusting member and in which the difference signal between these two values is applied to a servo-motor mechanism for displacement of the adjusting member, the linearity of the subsidiary controller being provided only for a small range of the difference around zero, the difference being brought after processing into at least one of the action circuits of the regulator;

said process comprising the step of acting on the input signal of the integral action circuit proportionally to the difference between said input difference signal and an error signal of another control variable.

2. The process of claim 1 in which said error signal is developed proportionally to the difference between the overall position signal of the regulator and the real position signal of the subsidiary controller.

3. A device for automatically reducing the lag in recovery of the circuits for controlling an adjusting member in a turbine and which circuits include a regulator having an integral action circuit, said regulator receiving a frequency reference siganl and the output frequency of the turbine and providing an overall signal of theoretical position of the adjusting member and a non-linear subsidiary controller receiving the overall signal and the real value signal of position of the adjusting member to emit a signal to control the adjusting member, wherein the improvement comprises a comparator, means for supplying said comparator with said overall signal and said real value signal, said comparator establishing a difference signal which enters into a multiplier, said multiplier produces a signal sent into a second comparator, said second comparator elaborating the difference between the signal received thereby and the difference between the output frequency and the frequency reference signal so that the output of said second comparator is introduced into the integral action circuit of the regulator.

* * * * *